US009572056B2

(12) United States Patent
Hinson

(10) Patent No.: US 9,572,056 B2
(45) Date of Patent: Feb. 14, 2017

(54) FAST SIGNAL SURVEYOR

(71) Applicant: RAYTHEON APPLIED SIGNAL TECHNOLOGY, INC., Sunnyvale, CA (US)

(72) Inventor: Jerry R. Hinson, Sunnyvale, CA (US)

(73) Assignee: Raytheon Applied Signal Technology, Inc., Sunnyvale, CA (US)

(*) Notice: Subject to any disclaimer, the term of this patent is extended or adjusted under 35 U.S.C. 154(b) by 134 days.

(21) Appl. No.: 14/585,954

(22) Filed: Dec. 30, 2014

(65) Prior Publication Data

US 2016/0192217 A1 Jun. 30, 2016

(51) Int. Cl.
*H04B 17/00* (2015.01)
*H04W 24/08* (2009.01)

(52) U.S. Cl.
CPC ............. *H04W 24/08* (2013.01); *H04B 17/00* (2013.01)

(58) Field of Classification Search
CPC .............................. H04W 24/08; H04B 17/00
See application file for complete search history.

(56) References Cited

U.S. PATENT DOCUMENTS

| 7,558,582 B2 * | 7/2009 | Karlsson | H04W 64/00 455/404.2 |
| 8,594,602 B2 | 11/2013 | Hinson | |
| 2008/0123544 A1 * | 5/2008 | Tujkovic | H04L 43/06 370/252 |
| 2010/0207670 A1 * | 8/2010 | Matsuoka | H04L 27/0014 327/113 |
| 2011/0013729 A1 * | 1/2011 | Yuba | H04L 27/2613 375/329 |
| 2011/0185059 A1 * | 7/2011 | Adnani | H04W 24/08 709/224 |

(Continued)

FOREIGN PATENT DOCUMENTS

| WO | WO 2007/050198 A1 | 5/2007 |
| WO | WO 2009/122194 A1 | 10/2009 |
| WO | WO 2012/137004 A1 | 10/2012 |

OTHER PUBLICATIONS

Written Opinion of the International Searching Authority for International Application No. PCT/US2015/045885 filed Oct. 9, 2015, Written Opinion of the International Searching Authority mailed Feb. 1, 2016 (6 pgs.).

(Continued)

*Primary Examiner* — Kenneth Lam
(74) *Attorney, Agent, or Firm* — Lewis Roca Rothgerber Christie LLP

(57) ABSTRACT

A system and method for characterizing a received radio frequency (RF) signal. In one embodiment, the system includes an antenna, a tuner, a sampler, a memory, and a processing unit connected to the memory, the processing unit being configured to receive a first sequence of samples from the sampler, perform a fast Fourier transform (FFT) operation, take the absolute value of a shifted complex frequency spectrum, perform a first filtering operation, perform a logarithmic operation, and perform an edge detection process to form an array of carrier centers and an array of carrier bandwidths. The processing unit is further configured to form, for each energy band identified as a result of the edge detection process, estimates of carrier characteristics and estimates of modulation characteristics.

18 Claims, 9 Drawing Sheets

(56) References Cited

U.S. PATENT DOCUMENTS

2015/0358091 A1* 12/2015 Sappok ............... H04B 17/309
   455/67.11

OTHER PUBLICATIONS

International Search Report for International Application No, PCT/US2015/045885, filed Oct. 9, 2015, International Search Report dated Jan. 25, 2016 and mailed Feb. 1, 2016 (4 pgs.).

* cited by examiner

FAST SIGNAL SURVEYOR

CROSS-REFERENCE TO RELATED APPLICATIONS

The present application is related to U.S. Pat. No. 8,594, 602, entitled "FAST CROSS-POLE CORRECTOR" (the "'602 Patent"), the entire content of which is incorporated herein by reference.

BACKGROUND

1. Field

One or more aspects of embodiments according to the present invention relate to surveying of transmitted radio frequency (RF) signals, and more particularly to a system and method for efficiently surveying and analyzing such RF signals.

2. Description of Related Art

Radio frequency (RF) signals, e.g., RF signals modulated to transmit digital data, are emitted by various sources for communications purposes, and it may be useful to identify individual transmitters, and to determine the carrier frequency, the modulation type, and modulation rate. It may also be useful to reconstruct the digital data being transmitted. In military applications, for example, this may be useful for identifying and analyzing the communications of other parties. In commercial applications, it may be useful, for example, for identifying sources of interference.

When a receiver is on an airborne platform, the received RF signal may change rapidly as the aircraft flies over various transmitters. In such a situation, a slow system for analyzing the RF signal may be ineffective.

Thus, there is a need for a fast system for surveying and analyzing transmitted RF signals.

SUMMARY

Aspects of embodiments of the present disclosure are directed toward a system and method for characterizing a received radio frequency (RF) signal. In one embodiment, the system includes an antenna, a tuner, a sampler, a memory, and a processing unit connected to the memory, the processing unit being configured to receive a first sequence of samples from the sampler, perform a fast Fourier transform (FFT) operation, take the absolute value of a shifted complex frequency spectrum, perform a first filtering operation, perform a logarithmic operation, and perform an edge detection process to form an array of carrier centers and an array of carrier bandwidths. The processing unit is further configured to form, for each energy band identified as a result of the edge detection process, estimates of carrier characteristics and estimates of modulation characteristics.

According to an embodiment of the present invention, there is provided a system for analyzing radio frequency signals, the system including: an antenna; a tuner; a sampler; a memory; and a processing unit connected to the memory, the processing unit being configured to: receive a first sequence of samples from the sampler for a first polarization state; perform a first fast Fourier transform (FFT) operation on the samples of the first sequence of samples and an FFT shift on a result of the first FFT operation to form a shifted complex frequency spectrum for the first polarization state; take the absolute value of the shifted complex frequency spectrum to form a shifted magnitude spectrum; perform a first filtering operation on the shifted magnitude spectrum to form a decimated and filtered magnitude spectrum; perform a logarithmic operation on the decimated and filtered magnitude spectrum to form a log filtered magnitude spectrum; perform an edge detection process to form an array of carrier centers and an array of carrier bandwidths; and for a first carrier center of the array of carrier centers and a corresponding first carrier bandwidth: perform an inverse FFT (IFFT) operation on a subarray of the shifted complex frequency spectrum to form a decimated complex time series for the first carrier, the subarray corresponding to a first range of frequencies, the first range of frequencies being centered on the first carrier, and having a frequency extent substantially equal to the first carrier bandwidth; and store the decimated complex time series in the memory.

In one embodiment, the processing unit is further configured to: receive a second sequence of samples from the sampler for a second polarization state; perform a second FFT operation on the second sequence of samples and an FFT shift on a result of the second FFT operation to form a shifted complex frequency spectrum for the second polarization state; and perform a fast cross-pole correction with the shifted complex frequency spectrum for the first polarization state and the shifted complex frequency spectrum for the second polarization state.

In one embodiment, the performing of a first filtering operation includes: performing an FFT operation on the shifted magnitude spectrum to form a spectrum of the shifted magnitude spectrum, selecting a contiguous subset of data points from the shifted magnitude spectrum, multiplying the subset by a windowing function to form windowed data; performing an inverse FFT (IFFT) operation on the windowed data to form a decimated and filtered complex spectrum.

In one embodiment, the windowing function is a Kaiser windowing function.

In one embodiment, the performing of a first filtering operation further includes: taking the absolute value of the decimated and filtered complex spectrum to form a decimated and filtered magnitude spectrum.

In one embodiment, the performing of a first filtering operation further includes taking the logarithm of the decimated and filtered magnitude spectrum and multiplying the logarithm by 20.

In one embodiment, the performing of the edge detection process includes scanning the log filtered magnitude spectrum in an ascending direction to identify a set of ascending rising edges and a set of ascending falling edges.

In one embodiment, the performing of the edge detection process further includes scanning the log filtered magnitude spectrum in a descending direction to identify a set of descending rising edges and a set of descending falling edges.

In one embodiment, the performing of the edge detection process further includes forming an expanded set of rising and falling edges by substituting, for each ascending falling edge in the set of ascending falling edges, a corresponding descending rising edge.

In one embodiment, the processing unit is further configured to form a normalized decimated complex time series, each element of the normalized decimated complex time series having unit magnitude and the same angle as a corresponding element of the decimated complex time series.

In one embodiment, the processing unit is further configured to raise each element of the normalized decimated complex time series to the power N to form a raised normalized decimated complex time series, N being a positive integer.

In one embodiment, N is selected from the group consisting of 2, 4, and 8.

In one embodiment, the processing unit is further configured to form a cross spectrum of the raised normalized decimated complex time series.

In one embodiment, the processing unit is further configured to perform cross spectrum analysis of the raised normalized decimated complex time series, to form a carrier frequency offset, a max/n3 for N, and a max/rms for N.

In one embodiment, the processing unit is further configured to calculate the angle of each element of the decimated complex time series to form a series of angles of the decimated complex time series.

In one embodiment, the processing unit is further configured to form a polar discriminator of the series of angles of the decimated complex time series.

In one embodiment, the processing unit is further configured to perform cross spectrum analysis of angles of the polar discriminator to form a symbol offset rate, a max/n3 for symbol rate, and a max/rms for symbol rate.

In one embodiment, the processing unit is further configured to form a precision carrier frequency estimate, a precision symbol rate estimate, and a modulation identification.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a fast signal surveyor provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
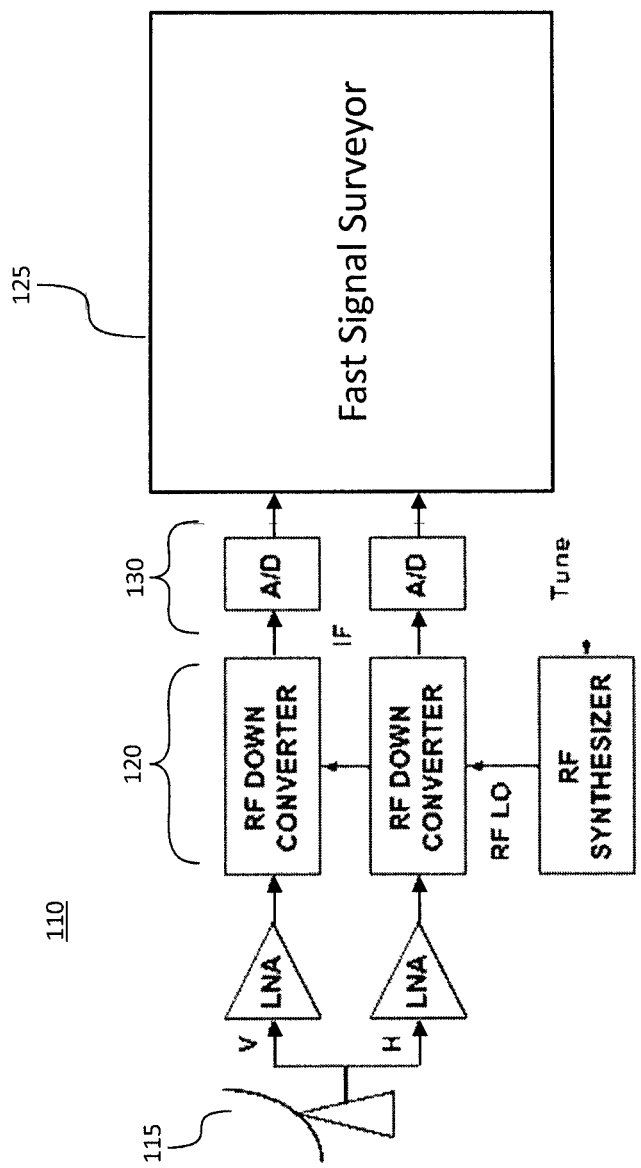
FIG. 1 is a block diagram of a signal surveyor according to an embodiment of the present invention.

Referring to FIG. 1, in one embodiment, a signal surveyor 110 includes an antenna 115, a tuner 120, a sampler and a processing unit implementing a fast signal surveyor 125. The sampler may include one or more A/D converters 130 providing digital samples of the downconverted signal or signals from one or more polarization states received by the antenna. The samples may include in-phase and quadrature phase samples, which may be received, or interpreted, by the processing unit as complex numbers.

Figure 2:
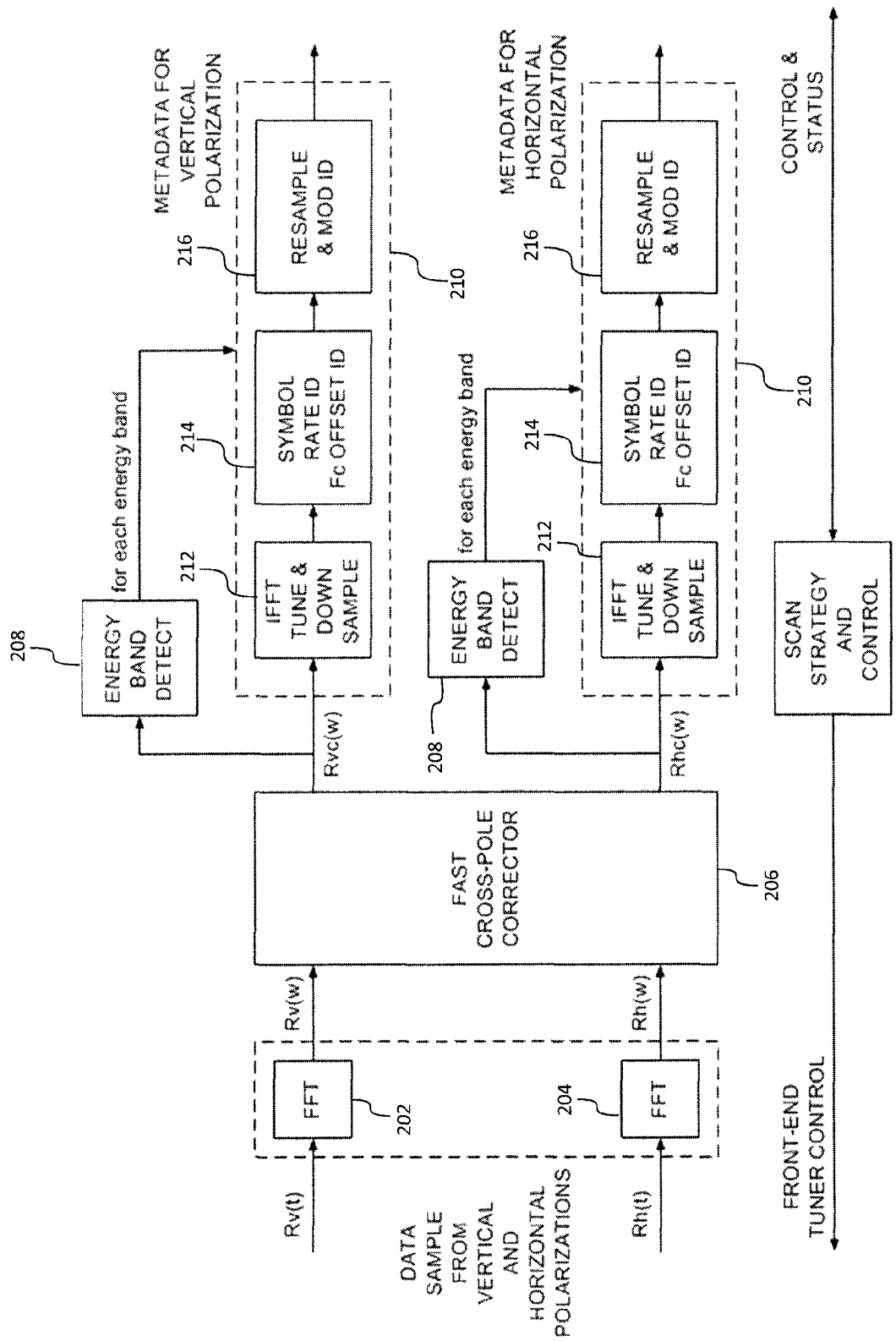
FIG. 2 is a block diagram of a fast signal surveyor according to an embodiment of the present invention.

Referring to FIG. 2, in one embodiment, a first sequence of samples corresponding to vertically polarized received electromagnetic waves is processed by a first fast Fourier transform (FFT) module 202 and a second sequence of samples corresponding to vertically polarized received electromagnetic waves is processed by a second FFT module 204, and the two resulting FFTs are combined in a fast cross-pole corrector 206, which separates the received signals into two data streams that correspond to independently transmitted polarization states, of which the received horizontally polarized and vertically polarized signals are linear combinations. Details of embodiments of the fast cross-pole corrector are provided in the '602 Patent. In other embodiments, the fast cross-pole corrector may be absent and the FFTs corresponding to the received horizontally polarized and vertically polarized signals may be fed directly to the subsequent processing modules; in one embodiment, only one FFT is formed, from either the signal corresponding to vertically polarized received electromagnetic waves or the signal corresponding to horizontally polarized received electromagnetic waves.

Subsequent processing then detects energy bands within the received signal, and performs additional analysis within each energy band, to form estimates of carrier and modulation characteristics within the band. When several distinct energy bands are present in a received signal, each such energy band may be the product of a transmitter, e.g., on the ground, radiating a carrier modulated with a digital modulation signal. The signal surveyor may then be used to separate the received signal into components corresponding to distinct energy bands, and to characterize each corresponding transmission.

Figure 3:
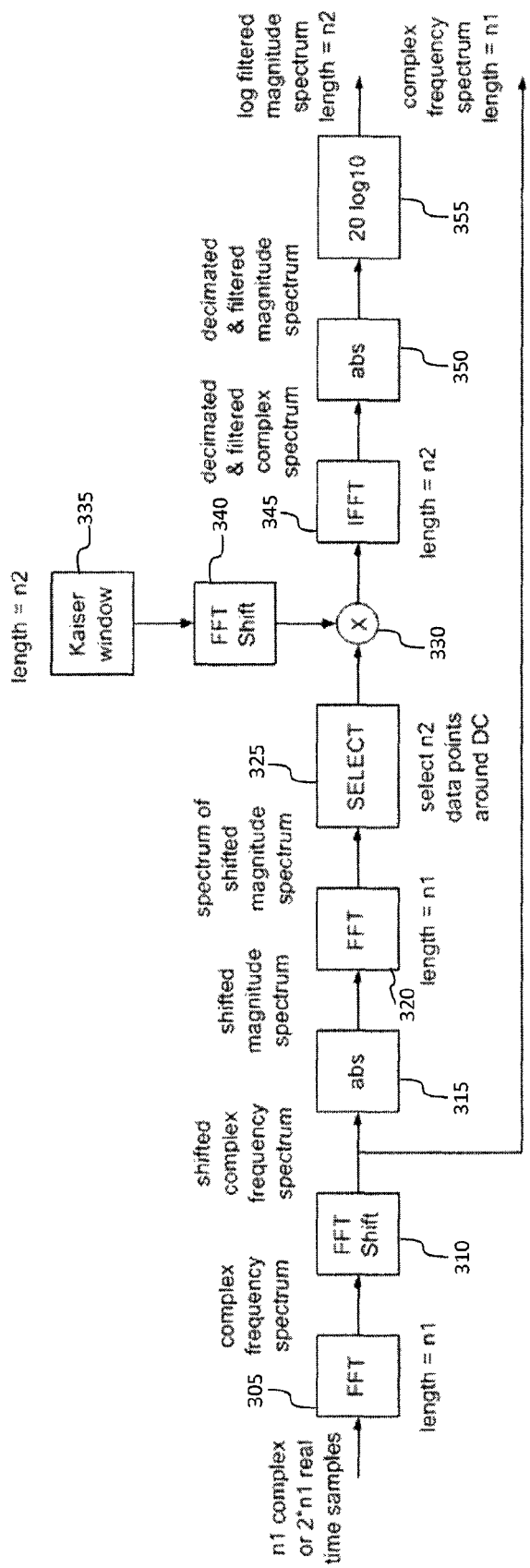
FIG. 3 is a block diagram of a system for forming a decimated log filtered magnitude spectrum and complex frequency spectrum according to an embodiment of the present invention.
Figure 4:
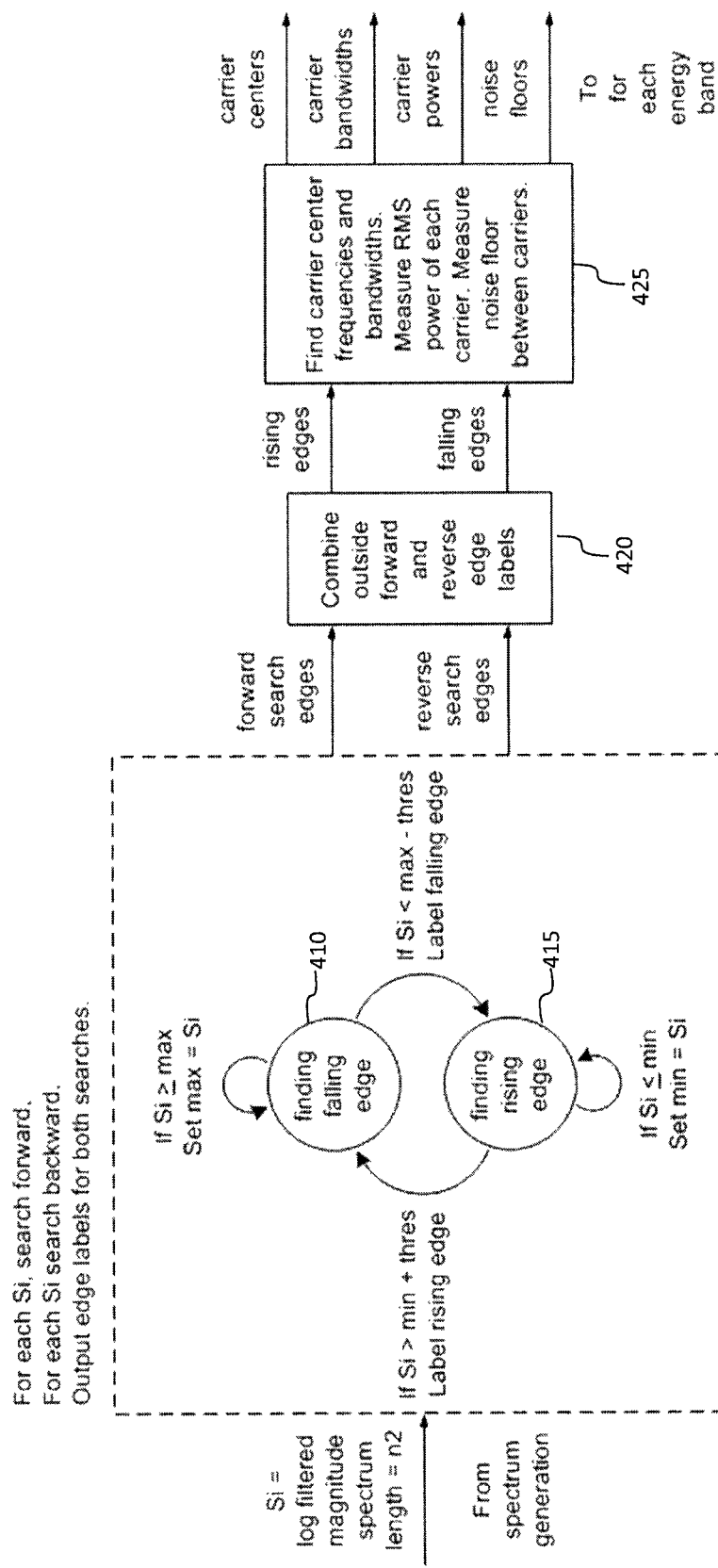
FIG. 4 is a block diagram of a system for identifying energy bands according to an embodiment of the present invention.

In one embodiment, a first FFT (from an FFT module, either directly or via the fast cross-pole corrector) is processed by an energy band detect module 208 and also, for each energy band detected, by a first analysis module 210, the first analysis module 210 including an inverse FFT (IFFT) tune and downsample module 212, a symbol rate ID (or symbol rate estimation) and carrier frequency ID (or carrier rate estimation) module 214, and a resampling and modulation ID module 216. A second FFT, e.g., corresponding to another polarization state, may be processed in the same manner. The energy band detect module 208 may be used to identify a number of energy bands and, for each band, estimate the carrier center frequency, the carrier bandwidth, the carrier power, and the noise floor. Referring to FIGS. 3 and 4, this may be accomplished by several cascaded modules. As used herein, a "module" is a system element that receives digital numerical input and generates digital numerical output. The numerical output may be stored in memory in a batch mode, in which, for example, an output array is formed and stored on a stack or in a heap for subsequent use or processing, or the numerical output may be streamed out of the module in smaller increments, e.g., one double-precision number at a time, or one byte at a time. The module may be implemented in software or in hardware or in a combination thereof. In one embodiment, each module is a piece of software (e.g., a function, a subroutine, or an object) running on a processing unit. In each case, the module has the effect of performing an operation on the data it receives, to generate the data that it produces. Thus, for embodiments disclosed herein, the system including a module that performs an operation is equivalent to the system being configured to perform the operation. For example, an FFT module performs an FFT operation on the input data that are fed to it, to form output data that are the FFT of the input data. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWB s. A processing unit may contain other processing units; for example, a processing unit may include two processing units, an FPGA and a CPU, interconnected on a PWB.

Referring to FIG. 3, in one embodiment, an array of input time samples is processed by a first FFT module 305 and a first FFT shift module 310 to generate a shifted complex frequency spectrum. This shifted complex frequency spectrum may be, for example, Rv(w), Rh(w), Rvc(w) or Rhc(w) in FIG. 2. The shifted complex frequency spectrum is then fed into the energy band detect module, which begins with a first absolute value module 315 in FIG. 3, which takes the magnitude of each element of the shifted complex frequency spectrum to form a shifted magnitude spectrum. The shifted magnitude spectrum is fed into a second FFT module 320 to form a spectrum of the shifted magnitude spectrum, the spectrum of the shifted magnitude spectrum is fed into a select module 325, which selects a subset of n2 contiguous data points around DC from the shifted magnitude spectrum. The output of the select module is then fed into a first multiplier 330. In the first multiplier, the output of the select module is multiplied by a windowing function formed by feeding a Kaiser window 335 through a second FFT shift module 340. The output of the multiplier is fed into a first inverse FFT (IFFT) module 345 to form a decimated and filtered complex spectrum, and the decimated and filtered complex spectrum is fed into second absolute value module 350, which takes the magnitude of each element to form a decimated and filtered magnitude spectrum. The decimated and filtered magnitude spectrum is fed into a first logarithmic module 355 (which takes a logarithm to the base 10 and multiplies by 20) to form a log filtered magnitude spectrum. The effect of this sequence of modules, beginning with the first absolute value module 315 and ending with the first logarithmic module 355, is to form a filtered (e.g., smoothed) spectrum of the time samples, which is then represented in decibels (dB), the degree of smoothing being determined by the shape and width (i.e., n2) of the Kaiser window 335. This filtering reduces the degree to which noise in the samples may influence the results of subsequent processing steps performed on the log filtered magnitude spectrum, and the value of n2 may be selected as a value that suppresses noise adequately without blurring the features of interest to an unacceptable degree.

Referring to FIG. 4, in subsequent processing, the log filtered magnitude spectrum is analyzed to identify, and to characterize the frequency extent of, energy bands in the signal. The log filtered magnitude spectrum is first fed into an edge detection module that estimates the upper and lower frequency boundaries of each energy band. The filtered magnitude spectrum is first scanned in an ascending direction, i.e., in the direction of increasing frequency. At each frequency point in the filtered magnitude spectrum, if the value of the filtered magnitude spectrum exceeds a minimum value plus a first threshold value, the frequency point is labeled as a rising edge, and the module switches to a state 410 in which it is searching for the next falling edge. When the value of the filtered magnitude spectrum next falls below a maximum value minus the first threshold value, the frequency point is labeled as a falling edge, and the module switches to a state 415 in which it is searching for the next rising edge. This process continues until the highest frequency point in the filtered magnitude spectrum is reached, and results in a set of ascending rising edges and ascending falling edges.

The process is then repeated in a descending direction, i.e., in the direction of decreasing frequency, to find a set of descending rising edges and descending falling edges. Each descending rising edge may fall close in frequency to a corresponding ascending falling edge, and each descending falling edge may fall close in frequency to a corresponding ascending rising edge. The set of ascending rising edges and ascending falling edges is then combined, in a module 420 for combining outside forward and reverse edge labels, to form an expanded set of rising and falling edges, formed by substituting, for each ascending falling edge in the set of ascending rising edges and ascending falling edges, the corresponding descending rising edge.

In a next step, a module 425 for finding the carrier center frequencies, the carrier bandwidths, the carrier power, and the noise power performs this function for each energy band by calculating the average of each rising edge in the expanded set of rising and falling edges and the falling edge that is the next higher falling edge in frequency in the expanded set of rising and falling edges, to find a carrier center frequency, and, by calculating the difference between this rising edge and this falling edge, to find the bandwidth of the carrier.

The carrier power is then calculated by integrating, numerically, the power in a frequency band centered on the carrier center frequency and having a bandwidth equal to the bandwidth of the carrier, and the noise floor is estimated on each side of each carrier from the value of the log filtered magnitude spectrum between carriers.

Figure 5:
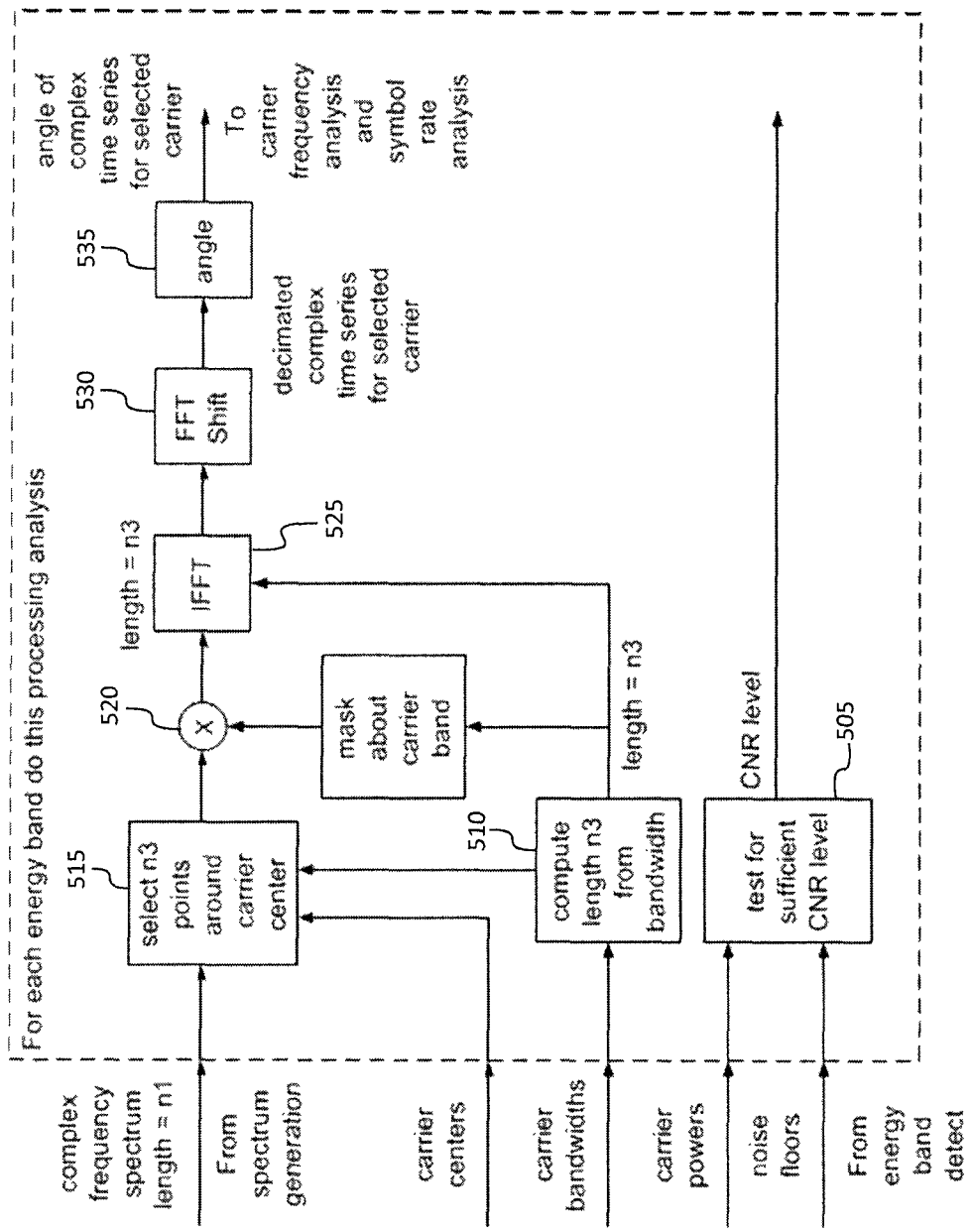
FIG. 5 is a block diagram of a system for extracting data corresponding to one energy band according to an embodiment of the present invention.

Referring to FIG. 5, in one embodiment, a set of modules then calculates, for each energy band, the angle of the complex time series for the selected carrier, i.e., the carrier in that energy band. A carrier to noise ratio (CNR) level module 505 tests the carrier to noise ratio and compares it to a threshold and outputs the CNR and whether the CNR exceeds the threshold; this result may be used by subsequent modules to provide an indication of the validity of, or a measure of confidence in, the results they generate. A module 510 for computing a length n3 finds this length as the ratio of the carrier bandwidth for the current frequency band to the width of the frequency bins in the shifted complex frequency spectrum, multiplied by a padding constant. The length n3, the shifted complex frequency spectrum (generated by the modules illustrated in FIG. 3), and the set of carrier center frequencies are fed into a module 515 for selecting a set of points from the shifted complex frequency spectrum forming a subarray of n3 points of the shifted complex frequency spectrum centered on the carrier center frequency for the current energy band. This subarray is multiplied, in a second multiplier 520, with a mask that sets to zero points on each end of the array that fall outside of the energy band. Thus, the padding constant determines the number of zero-valued elements that are formed at each end of the array as a result of multiplying by the mask. The array resulting from the multiplication is then processed by a second IFFT module 525, and shifted by a third FFT shift module 530 to form a decimated complex time series for the carrier of the current energy band. The angle (i.e., the argument of the complex value) of each point in the decimated complex time series is then calculated by an angle module 535, to form an array of angles of the complex time series for the selected carrier. This array is fed to two parallel sets of modules, one of which is illustrated in FIG. 6, and the other of which is illustrated in FIG. 7.

Figure 6:
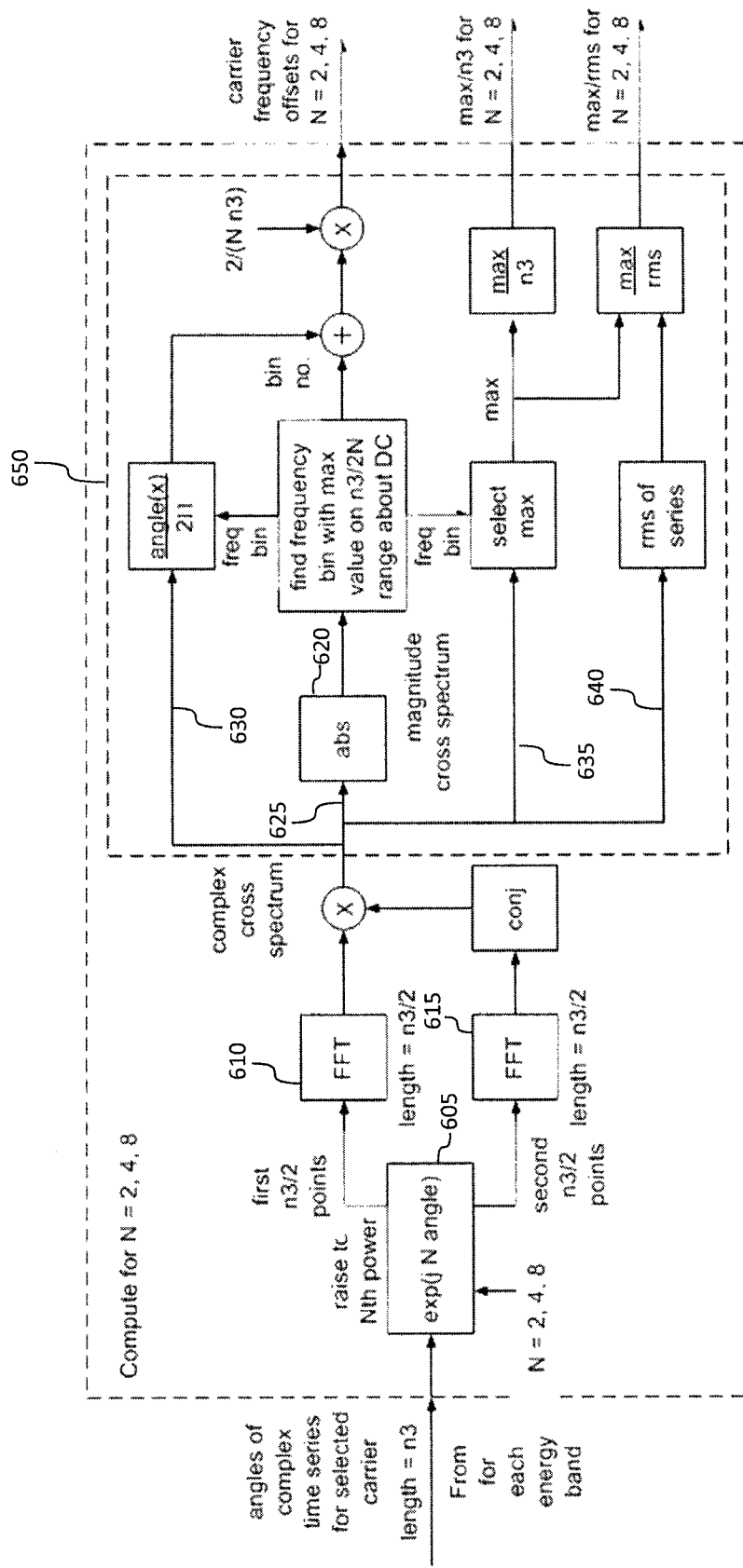
FIG. 6 is a block diagram of a system for forming preliminary estimates of carrier characteristics according to an embodiment of the present invention.

Referring to FIG. 6, in one embodiment, a set of modules processes the array of angles of the complex time series for the selected carrier, for each of the three integer values N=2, 4, and 8, each corresponding to a different nonlinearity. A module 605 for forming a power of N calculates, for each of the angle values in the array of angles of the complex time series, the value of exp(j N angle), i.e., a complex number with unit magnitude and having an argument that is N times the angle value. This operation is equivalent to normalizing each element of the decimated complex time series (i.e., dividing each complex number by its magnitude) and raising each element of the normalized decimated complex time series to the power N. This module produces an array with n3 elements, which is divided into two halves, the first half of which (having n3/2 elements) is fed into a third FFT module 610 and the other half of which (also having n3/2 elements) is fed into a fourth FFT module 615. The complex conjugate of the output of the fourth FFT module is taken and the complex conjugate is multiplied by the output of the third FFT module, to form a first complex cross spectrum.

The first complex cross spectrum is then processed in four data paths. In a first data path 625, the magnitude of the first complex cross spectrum is taken in a third absolute value module 620, to form the magnitude of the first cross spectrum. The frequency bin with the maximum value over a range of frequency bins extending n3/(2N) elements from the central (DC) bin is selected. In a second data path 630, the angle of the first complex cross spectrum at the selected frequency bin is divided by $2\pi$ and added to the number of the selected frequency bin, and multiplied by 2/n3, to form carrier frequency offsets for N=2, 4, 8, which may be referred to as cfo(2), cfo(4), and cfo(8), respectively, or, more generally, as cfo(N). In the third data path 635 of the four data paths, the element of the first complex cross spectrum at the selected frequency bin, which is the max value of the first complex cross spectrum, is divided by n3 to form a quantity referred to as "max/n3 for N=2, 4, 8", and in the fourth data path 640 of the four data paths, the max value of the first complex cross spectrum is divided by the root mean square (rms) of the first complex cross spectrum to form a quantity referred to as the "max/rms for N=2, 4, 8". These quantities are preliminary estimates, in the sense that their significance depends on the modulation type, as discussed in further detail below. For example, the carrier frequency offset for N=2 may become the precision carrier frequency estimate if the modulation type is subsequently determined to be BPSK.

Figure 7:
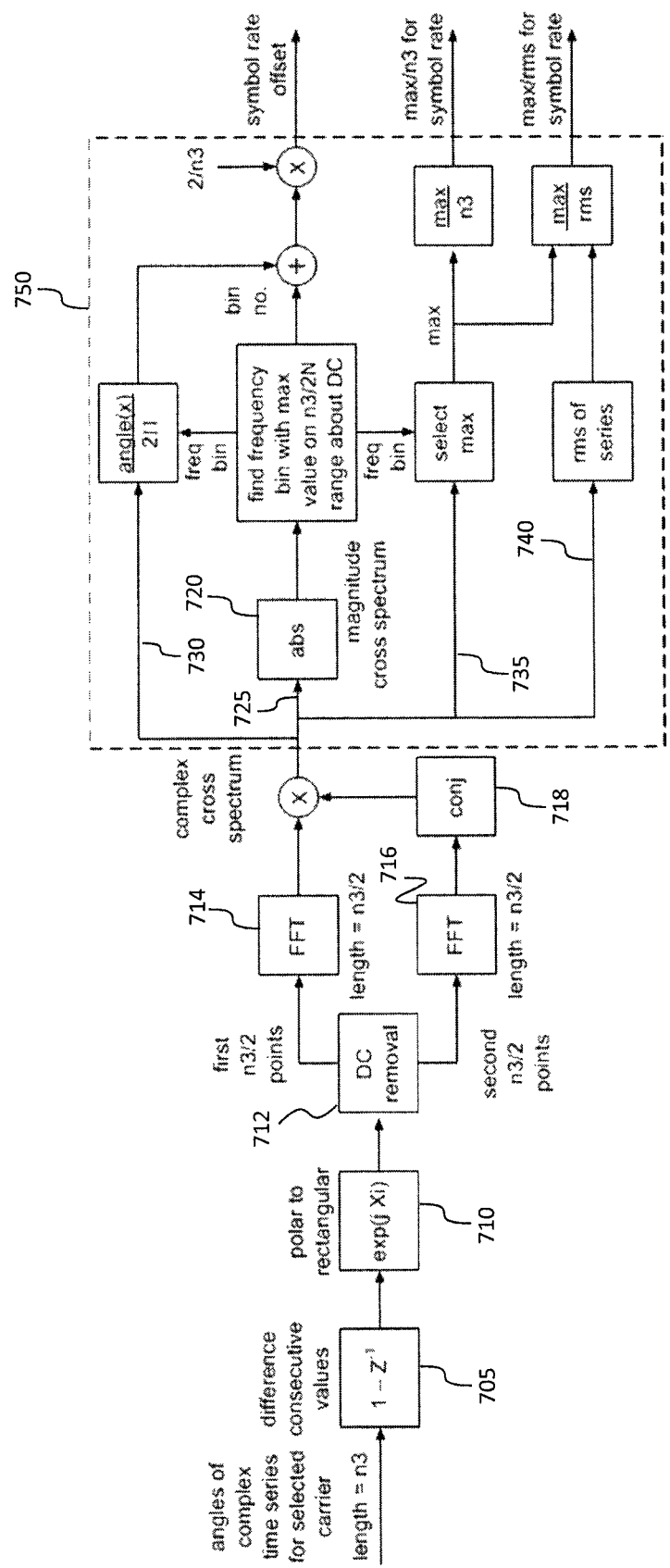
FIG. 7 is a block diagram of a system for forming preliminary estimates of symbol rate characteristics according to an embodiment of the present invention.

Referring to FIG. 7, the array of angles of the complex time series for the selected carrier is also processed by a set of modules for forming preliminary estimates of modulation characteristics. Differences between consecutive values of the angle are taken in a difference module 705, and the differences are converted to complex numbers (each having unit magnitude and an argument equal to the difference in angles). The array of differences is fed to a polar to rectangular module 710 that converts each complex number into rectangular form to form a polar discriminator. As used herein, the formation of a "polar discriminator" from an array of real numbers (which may represent angles of an array of complex numbers) entails subtracting consecutive values in the array to form a difference array (shorter than the original array by 1), and forming an array of complex numbers, each element of which contains, in rectangular form, a complex number having unit magnitude and an angle equal to a corresponding element of the difference array. The mean of the resulting array of complex numbers is subtracted in a DC removal module 712, and the output of the DC removal module 712 is fed to a fifth FFT module 714 and to a sixth FFT module 716. The output of the sixth FFT module 716 is fed to a second complex conjugate module 718 and the output of the fifth FFT module 714 is multiplied by the output of the complex conjugate module 718 to form a second complex cross spectrum.

The second cross spectrum is processed in the same manner as that used for the first complex cross spectrum. That is, the second cross spectrum is processed in four parallel data paths. In a first data path 725, the magnitude of the second complex cross spectrum is taken in a fourth absolute value module 720, to form the magnitude of the second cross spectrum. The frequency bin with the maximum value over a range of frequency bins extending n3/(2N) elements from the central (DC) bin is selected. In a second data path 730, the angle of the second complex cross spectrum at the selected frequency bin is divided by $2\pi$ and added to the number of the selected frequency bin, and multiplied by 2/n3, to form the symbol offset rate. In a third data path 735 of the four data paths, the element of the second complex cross spectrum at the selected frequency bin, which is the max value of the second complex cross spectrum, is divided by n3, to form a quantity referred to as "max/n3 for symbol rate", and in a fourth data path 740 of the four data paths, the max value of the second complex cross spectrum is divided by the root mean square (rms) of the second complex cross spectrum to form a quantity referred to as the "max/rms for symbol rate". As used here, forming a "cross spectrum" from an array of numbers refers to taking an FFT of the first half of the array, and taking an FFT of the second half of the array, and multiplying one of these FFTs by the complex conjugate of the other, as shown in FIGS. 6 and 7. The set of modules 650 of FIG. 6, duplicated in FIG. 7 (as the set of modules 750), that receives a complex cross spectrum and generates either (in FIG. 6) carrier frequency offsets for N=2, 4, 8, (i.e., cfo(2), cfo(4), and cfo(8)), max/n3 for N=2, 4, 8, and max/rms for N=2, 4, 8, or (in FIG. 7) a symbol offset rate, max/n3 for symbol rate, and max/rms for symbol rate forms a compound module (i.e., a module containing other modules) referred to herein as a complex cross spectrum analysis module, which performs cross spectrum analysis.

Figure 8:
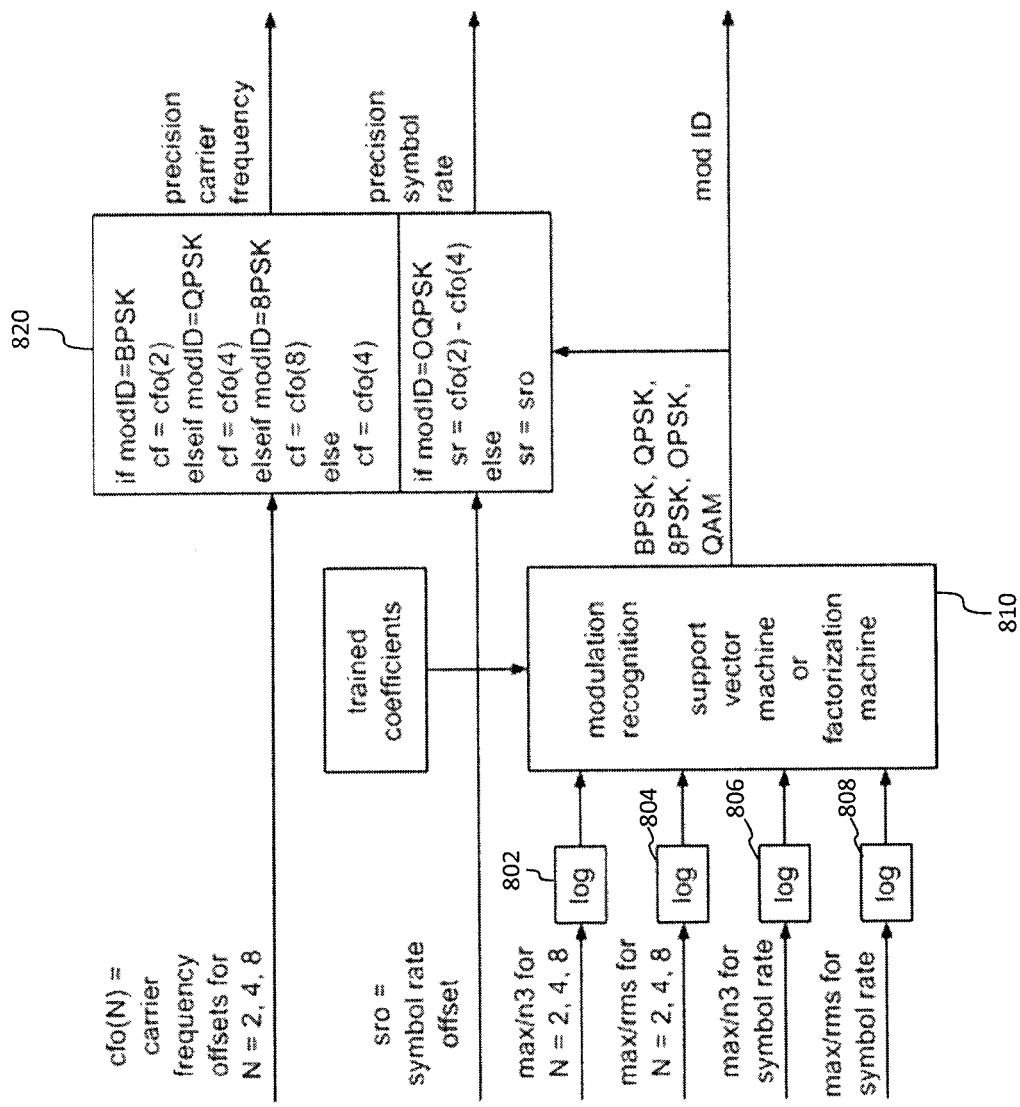
FIG. 8 is a block diagram of a system for forming final estimates of carrier, symbol rate, and modulation characteristics according to an embodiment of the present invention.

After the output of three iterations (for N=2, 4, 8) of the set of modules in FIG. 6, and one iteration (forming and processing the polar discriminator) of the set of modules of FIG. 7, additional operations may be performed as illustrated in FIG. 8. In one embodiment, the quantities max/n3 for N=2, 4, 8; max/rms for N=2, 4, 8; max/n3 for symbol rate; and max/rms for symbol rate are fed into a second logarithmic module 802, a third logarithmic module 804, a fourth logarithmic module 806, and a fifth logarithmic module 808, and the outputs of these logarithmic modules are fed into a modulation recognition module 810 which may be a support vector machine or a factorization machine, which receives trained coefficients and identifies the modulation type, e.g., as one of binary phase-shift keying (BPSK), quadrature phase-shift keying (QPSK), eight-phase phase-shift keying (8PSK), offset quadrature phase-shift keying (OQPSK), or quadrature amplitude modulation (QAM). This identification, or "modID", is produced as an output of the fast signal surveyor, and is also fed into a precision estimation module. The precision estimation module 820 receives the three carrier frequency offsets cfo(N) for N=2, 4, 8, the symbol rate offset and the modulation ID. The precision estimation module selects cfo(2) as the precision carrier frequency if the modID is BPSK, it selects cfo(4) as the precision carrier frequency if the modID is QPSK, it selects cfo(8) as the precision carrier frequency if the modID is 8PSK, and it selects cfo(4) as the precision carrier frequency otherwise. The precision estimation module calculates cfo(2)-cfo(4) as the precision symbol rate if the modID is OQPSK, and it selects the symbol rate offset (sro) as the precision symbol rate otherwise.

Once the precision symbol rate and the precision carrier frequency are known, the resampling and modulation ID module 216 (FIG. 2) may perform a precision resampling process, and output the time domain stream to a recognizable eye pattern, and make symbol decisions.

Figure 9:
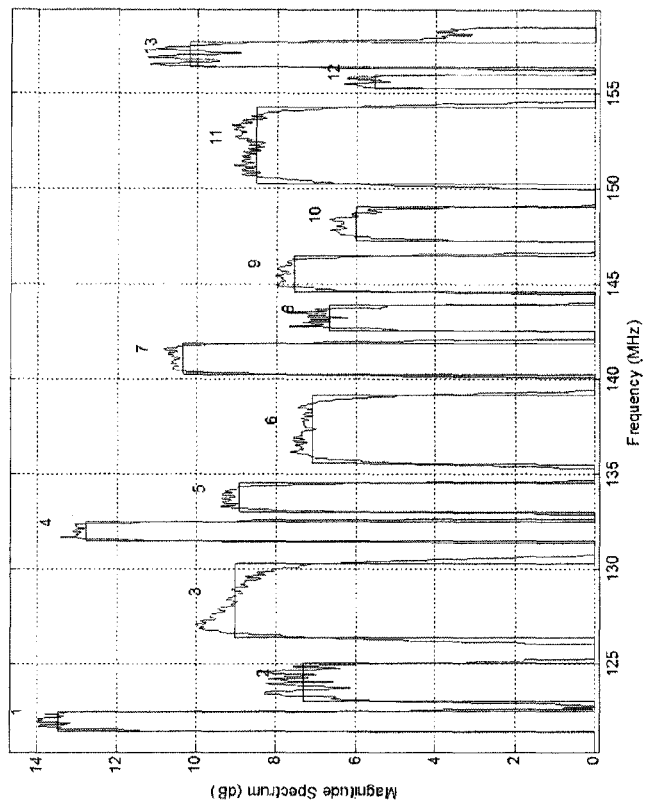
FIG. 9 is a diagram of a user display showing survey results according to an embodiment of the present invention.

Referring to FIG. 9, in one embodiment, a user display includes a graphical spectrum display showing the magnitude spectrum of a received signal, with several energy bands identified and each labelled with a number. The user display also includes a tabular display showing a list of the energy bands, and, for each, a precise estimate of the carrier frequency, the carrier power, the bandwidth of the carrier, a precise estimate of the symbol rate, and the modID.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially", "about", and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of a fast signal surveyor have been specifically described and illustrated herein, many modifications and variations will be apparent to those skilled in the art. Accordingly, it is to be understood that a fast signal surveyor employed according to principles of this invention may be embodied other than as specifically described herein. The invention is also defined in the following claims, and equivalents thereof.

What is claimed is:

1. A system for analyzing radio frequency signals, the system comprising:
   an antenna;
   a tuner;
   a sampler;
   a memory; and
   a processing unit connected to the memory, the processing unit being configured to:
      receive a first sequence of samples from the sampler for a first polarization state;
      perform a first fast Fourier transform (FFT) operation on the samples of the first sequence of samples and an FFT shift on a result of the first FFT operation to form a shifted complex frequency spectrum for the first polarization state;
      take the absolute value of the shifted complex frequency spectrum to form a shifted magnitude spectrum;
      perform a first filtering operation on the shifted magnitude spectrum to form a decimated and filtered magnitude spectrum;
      perform a logarithmic operation on the decimated and filtered magnitude spectrum to form a log filtered magnitude spectrum;
      perform an edge detection process to form an array of carrier centers and an array of carrier bandwidths; and
      for a first carrier center of the array of carrier centers and a corresponding first carrier bandwidth:
         perform an inverse FFT (IFFT) operation on a subarray of the shifted complex frequency spectrum to form a decimated complex time series for the first carrier, the subarray corresponding to a first range of frequencies, the first range of frequencies being centered on the first carrier, and having a frequency extent substantially equal to the first carrier bandwidth; and store the decimated complex time series in the memory.

2. The system of claim 1, wherein the processing unit is further configured to: receive a second sequence of samples from the sampler for a second polarization state;

perform a second FFT operation on the second sequence of samples and an FFT shift on a result of the second FFT operation to form a shifted complex frequency spectrum for the second polarization state; and perform a fast cross-pole correction with the shifted complex frequency spectrum for the first polarization state and the shifted complex frequency spectrum for the second polarization state.

3. The system of claim 1, wherein the performing of the first filtering operation comprises:

performing an FFT operation on the shifted magnitude spectrum to form a spectrum of the shifted magnitude spectrum;

selecting a contiguous subset of data points from the shifted magnitude spectrum;

multiplying the subset by a windowing function to form windowed data; and performing an inverse FFT (IFFT) operation on the windowed data to form a decimated and filtered complex spectrum.

4. The system of claim 3, wherein the windowing function is a Kaiser windowing function.

5. The system of claim 3, wherein the performing of the first filtering operation further comprises:

taking the absolute value of the decimated and filtered complex spectrum to form a decimated and filtered magnitude spectrum.

6. The system of claim 5, wherein the performing of the first filtering operation further comprises taking the logarithm of the decimated and filtered magnitude spectrum and multiplying the logarithm by 20.

7. The system of claim 1, wherein the performing of the edge detection process comprises scanning the log filtered magnitude spectrum in an ascending direction to identify a set of ascending rising edges and a set of ascending falling edges.

8. The system of claim 7, wherein the performing of the edge detection process further comprises scanning the log filtered magnitude spectrum in a descending direction to identify a set of descending rising edges and a set of descending falling edges.

9. The system of claim 8, wherein the performing of the edge detection process further comprises forming an expanded set of rising and falling edges by substituting, for each ascending falling edge in the set of ascending falling edges, a corresponding descending rising edge.

10. The system of claim 1, wherein the processing unit is further configured to form a normalized decimated complex time series, each element of the normalized decimated complex time series having unit magnitude and the same angle as a corresponding element of the decimated complex time series.

11. The system of claim 10, wherein the processing unit is further configured to raise each element of the normalized decimated complex time series to the power N to form a raised normalized decimated complex time series, N being a positive integer.

12. The system of claim 11, wherein N is selected from the group consisting of 2, 4, and 8.

13. The system of claim 11, wherein the processing unit is further configured to form a cross spectrum of the raised normalized decimated complex time series.

14. The system of claim 13, wherein the processing unit is further configured to perform cross spectrum analysis of the raised normalized decimated complex time series, to form a carrier frequency offset.

15. The system of claim 14, wherein the processing unit is further configured to calculate the angle of each element of the decimated complex time series to form a series of angles of the decimated complex time series.

16. The system of claim 15, wherein the processing unit is further configured to form a polar discriminator of the series of angles of the decimated complex time series.

17. The system of claim 16, wherein the processing unit is further configured to perform cross spectrum analysis of angles of the polar discriminator to form a symbol offset rate.

18. The system of claim 17, wherein the processing unit is further configured to form a precision carrier frequency estimate, a precision symbol rate estimate, and a modulation identification.

* * * * *